(12) United States Patent
Shim

(10) Patent No.: US 6,326,749 B1
(45) Date of Patent: Dec. 4, 2001

(54) MOTOR ROTATION CONTROL DEVICE FOR OPTICAL DISK PLAYER

(75) Inventor: Jae-Seong Shim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/218,162

(22) Filed: Dec. 22, 1998

(30) Foreign Application Priority Data

Dec. 31, 1997 (KR) .................................................. 97-80578

(51) Int. Cl.[7] ...................................................... H02P 6/22
(52) U.S. Cl. ........................ 318/257; 318/260; 318/437; 318/565
(58) Field of Search ..................................... 318/138, 254, 318/437, 439, 463, 565, 256, 257, 260, 280

(56) References Cited

U.S. PATENT DOCUMENTS

| | | | |
|---|---|---|---|
| 4,292,577 | * 9/1981 | Cesarz et al. | 318/802 |
| 4,331,917 | * 5/1982 | Render et al. | 324/166 |
| 4,339,699 | * 7/1982 | De Jonge et al. | 318/561 |
| 4,367,435 | * 1/1983 | Bailey et al. | 318/269 X |
| 4,473,226 | * 9/1984 | Siegel et al. | 318/159 |
| 5,376,870 | * 12/1994 | Ueda et al. | 318/603 |
| 5,422,810 | * 6/1995 | Brunning et al. | 180/79.1 |

* cited by examiner

*Primary Examiner*—Bentsu Ro
(74) *Attorney, Agent, or Firm*—Staas & Halsey, LLP

(57) ABSTRACT

A motor rotation control device for an optical disk player including a motor outputting rotation signals, a sensor for sensing the rotational direction and rotational state of the motor in response to rotation signals of the motor, a motor control signal generator for generating a motor control signal according to the rotational direction and rotational state of the motor, and a motor rotation controller for controlling the rotation of the motor in response to the motor control signal. The motor rotation control device operates independently of a system controller, thereby reducing the load on the system controller.

11 Claims, 8 Drawing Sheets

MOTOR ROTATION CONTROL DEVICE FOR OPTICAL DISK PLAYER

CROSS-REFERENCE TO RELATED APPLICATIONS

This application claims the benefit of Korean Application No. 80578/1997, filed Dec. 31, 1997, in the Korean Patent Office, the disclosure of which is incorporated herein by reference.

BACKGROUND OF THE INVENTION

The present invention relates to an optical disk player, and more particularly, to a motor rotation control device for an optical disk player.

FIG. 1 is a diagram of a conventional motor rotation control device 10. To rotate a stationary disk (not shown) at a normal speed, a system controller 100 outputs a forward acceleration signal to a motor rotation controller 102 causing a motor 104 to forwardly accelerate. When the disk is rotating at a normal speed, the system controller 100 supplies a normal driving signal to the motor rotation controller 102 causing the motor rotation controller 102 to continue rotation of the motor 104 so as to maintain a Constant Angular Velocity (CAV) or a Constant Linear Velocity (CLV) of the optical disk. If the motor 104 accelerates to an explosive (or overrun) state, the system controller 100 outputs a backward acceleration signal to the motor rotation controller causing the motor 104 to backwardly accelerate (i.e., decelerate) so as to reach a normal speed range. During operation, the motor 104 supplies motor rotation signals (including a period of rotation) to the system controller 100.

In summary, the motor rotation controller 102 causes the motor 104 to forwardly rotate in response to a forward acceleration signal, controls the motor 104 at a CLV/CAV in response to a normal driving signal, and causes the motor 104 to rotate backwards in response to a backward acceleration signal.

FIG. 2 is a flowchart of a conventional motor rotation control process. At step 200, the system controller 100 generates a forward acceleration signal to accelerate the motor 104 forwardly. At step 202, the system controller 100 checks the period of the rotation, using the motor rotation signal generated from the motor 104, and judges whether the number of rotations per unit of time of the motor 104 is greater than a number N corresponding to a forward acceleration limit speed. If the number of rotations is not greater than the number N, the process goes to step 204 and the system controller 100 continues to accelerate the motor 104 forwardly. If, in step 202, the number of rotations is greater than the number N, the process goes to step 206 and the system controller 100 checks whether the number of rotations per unit of time of the motor 104 is less than a number M corresponding to a backward acceleration limit speed.

If, in step 206, the number of rotations is less than the number M, the process goes to step 210 and the system controller 100 carries out normal CLV/CAV control of the motor 104. The process then returns to step 202. If, in step 206, the number of rotations is not less than the number M, the process goes to step 208 and the system controller 100 generates a backward acceleration signal to accelerate the motor 104 backwardly at step 208. The process then returns to step 202.

The system controller 100 must continually check the rotation period of the motor 104 so as to be able to set a forward acceleration speed and a backward acceleration speed for the motor 104. Hence, the system controller 100 must spend a lot of time checking the rotation speed of the motor 100. Unfortunately, in the conventional motor rotation control device, while controlling the motor 100 at a CLV/CAV, the system controller 100 does not know whether the motor 104 is rotating forwardly or backwardly. Therefore, it is difficult to prevent the motor 104 from rotating backwardly during focus drop, i.e., when the RF signal from the optical pickup contains only noise and no sync signal, and degrading the performance of an optical disk player.

The system controller 100 must continually check the rotation period of the motor 104 so as to be able to set a forward acceleration speed and a backward acceleration speed for the motor 104. Hence, the system controller 100 must spend a lot of time checking the rotation speed of the motor 100. Unfortunately, in the conventional motor rotation control device, while controlling the motor 100 at a CLV/CAV, the system controller 100 does not know whether the motor 104 is rotating forwardly or backwardly. Therefore, it is difficult to prevent the motor 104 from rotating backwardly during focus drop, i.e., when the RF signal from the optical pickup contains only noise and no sync signal, and degrading the performance of an optical disk player.

SUMMARY OF THE INVENTION

It is an object of the present invention to provide a motor rotation control device for an optical disk player which can reduce the load of a system controller while driving a motor.

It is a further object of the present invention to provide a motor rotation control device in which a system controller is aware of the rotational direction of the motor.

These and other objects of the present invention are realized by a motor rotation control device for an optical disk player comprising a motor, a sensor sensing the rotational direction and rotational state of the motor in response to rotation signals of the motor, a motor control signal generator generating a motor control signal according to the rotational direction and rotational state of the motor, and a motor rotation controller controlling the rotation of the motor in response to the motor control signal.

BRIEF DESCRIPTION OF THE DRAWINGS

The above and other objects, features and advantages of the present invention will become more apparent from the following detailed description when taken in conjunction with the accompanying drawings of which.

DETAILED DESCRIPTION OF THE PREFERRED EMBODIMENT

In the following description, numerous specific details are set forth to provide a more thorough understanding of the present invention. However, one skilled in the art does not need every specific detail to practice the invention. Accordingly, well known functions or constructions have not been described, so as not to obscure the description and understanding of the present invention.

Figure 8:
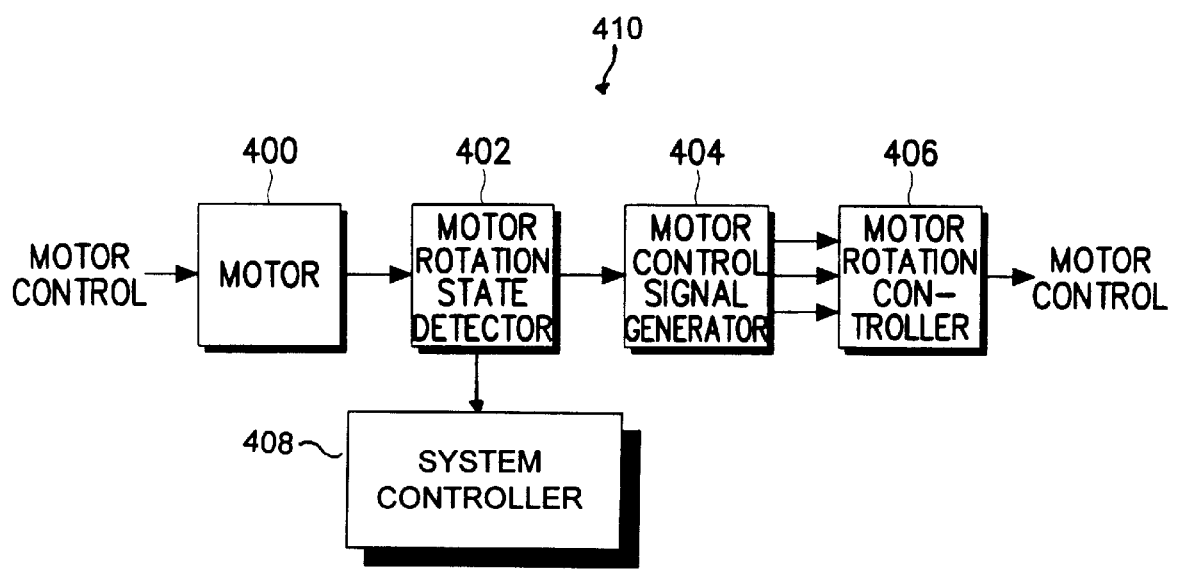
FIG. 8 is an overall block diagram of a motor rotation control device according to the preferred embodiment of the present invention.

FIG. 8 is a block diagram of a motor rotation control device 410 according to a preferred embodiment of the present invention. A motor 400 rotates under the control of a motor rotation controller 406. The motor 400 generates rotation sensing signals u, v and w. A motor rotational state detector 402 checks, in response to the rotation sensing signals u, v, and w, whether the motor 400 is rotating forwardly or backwardly. The motor rotational state detector 402 also determines whether the motor 400 is rotating within the range of a forward accelerated interval, a backward accelerated interval or a normal driving interval.

The motor rotational state detector 402 generates a plurality of signals (explained in more detail hereinafter) including a signal indicating the rotational direction of the motor 400 supplied to a system controller 408. Using this signal, the system controller can determine the rotational direction of the motor 400 at any time.

The plurality of signals generated by the motor rotational state detector 402 are supplied to a motor control signal generator 404. The motor control signal generator 404 generates signals for accelerating the motor 400 forwardly or backwardly. The motor control signal generator 404 also generates a signal for maintaining the motor 400 at a current state. A motor rotation controller 406, connected to the motor control signal generator 404, controls the rotation of the motor 400 in response to the signals generated by the motor control signal generator 404.

Figure 1:
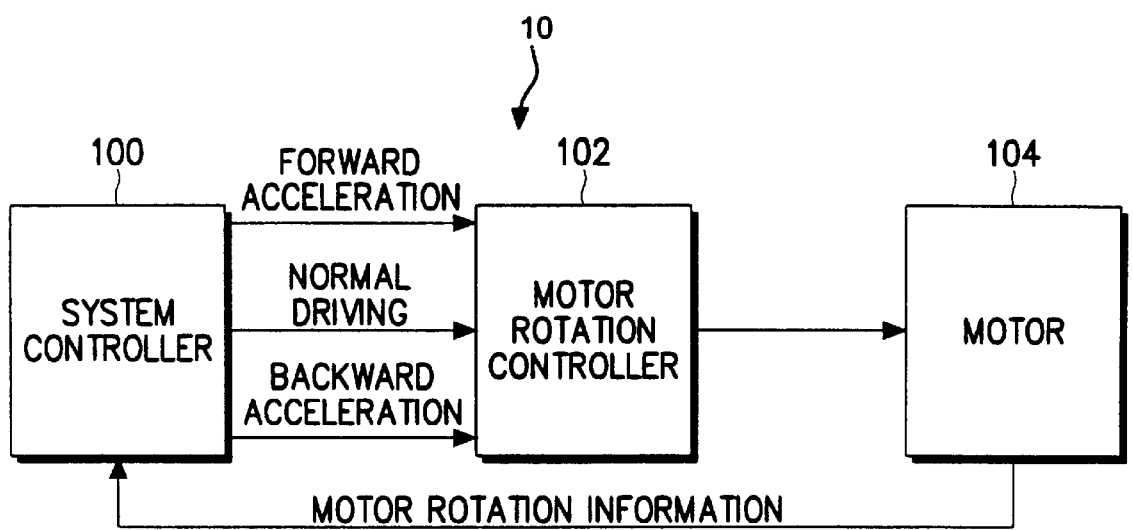
FIG. 1 is a block diagram of a conventional motor rotation control device.
Figure 2:
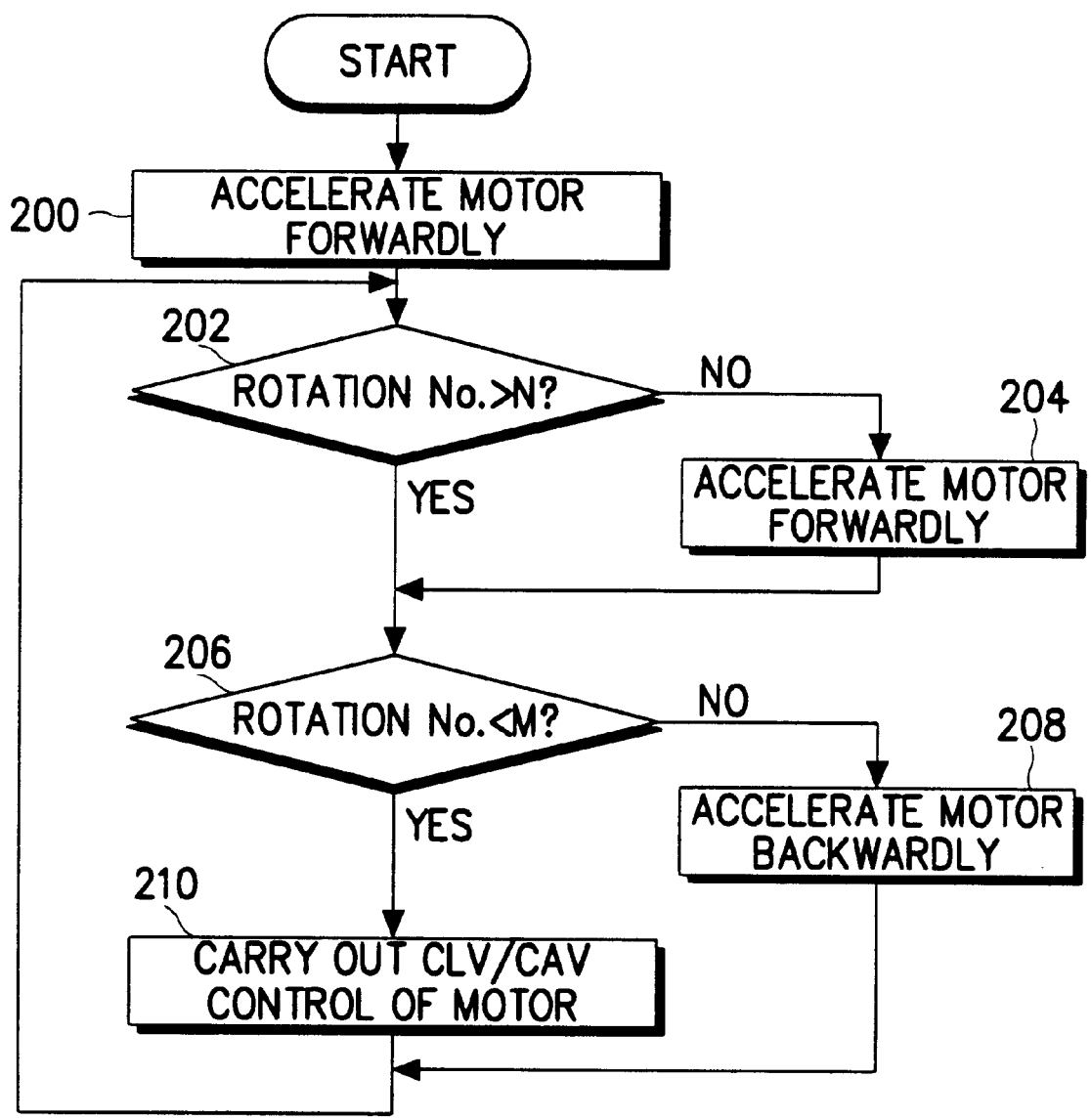
FIG. 2 is a flow chart of a conventional motor rotation control process.
Figure 3:
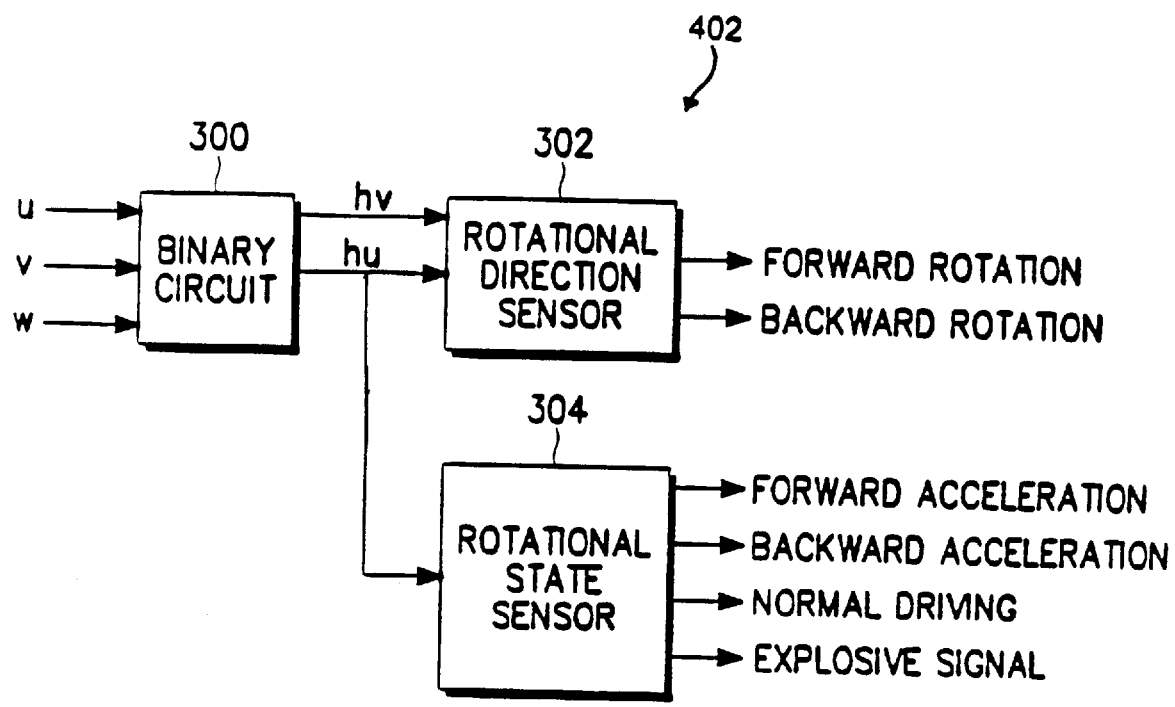
FIG. 3 is a block diagram of a motor rotational state detector according to the preferred embodiment of the present invention.

FIG. 3 is a block diagram of the motor rotational state detector 402 shown in FIG. 8. The rotation sensing signals u, v and w, sensed from a spindle of the motor 400 at intervals of 120°, are supplied to a binary circuit 300. The motor 400 may be, for example, a brushless motor. The binary circuit 300 binarizes the sensing signals u, v and w and generates binary signals hu, hv and hw (not shown). The binary signals hu and hv are supplied to a rotational direction sensor 302, while the sensing signal hu is supplied to a rotational state sensor 304. The rotational direction sensor 302 compares phases of the binary signals hu and hv to determine whether the motor 400 is rotating forwardly or backwardly and outputs a forward or backward rotation sensing signal, respectively.

Figure 4:
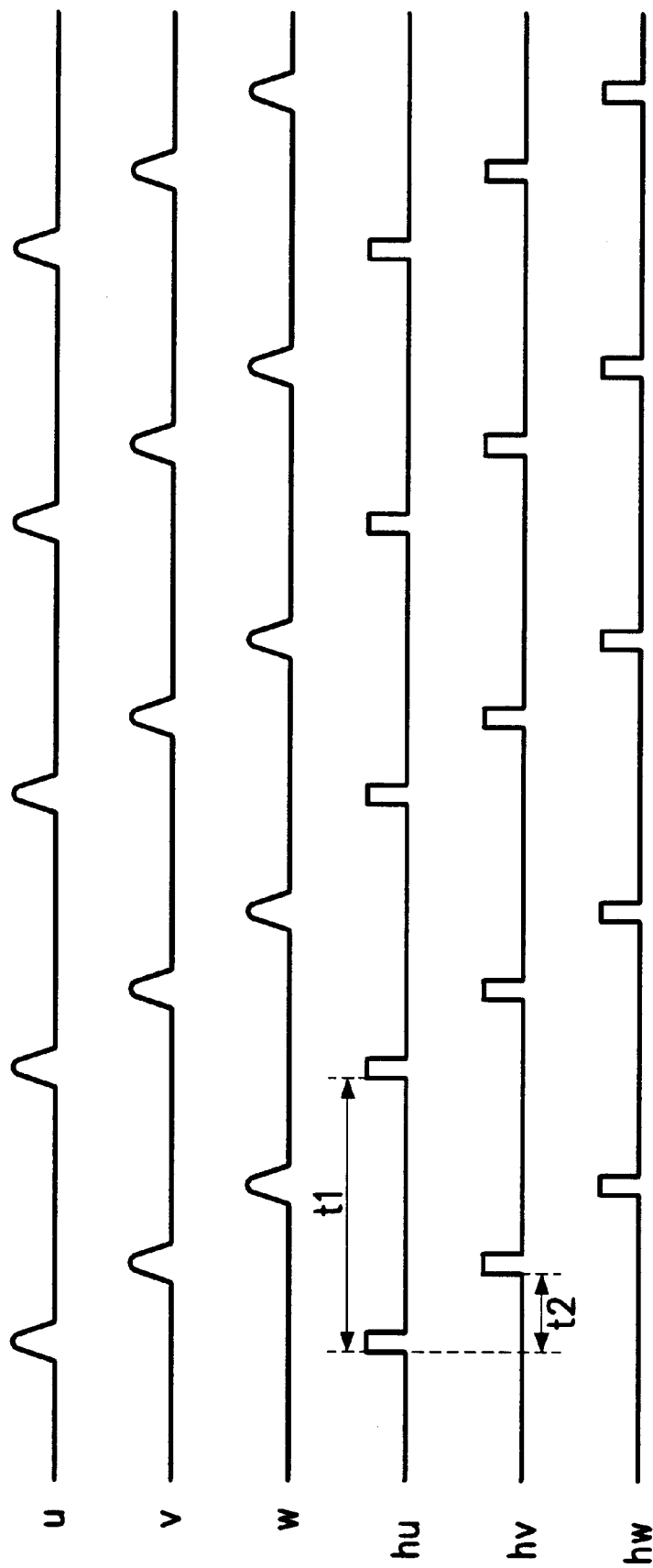
FIG. 4 is a diagram of waveforms of signals generated by the rotation of a motor.

FIG. 4 is a diagram of waveforms of signals generated by the motor 400 and the binary circuit 300. Specifically, FIG. 4 shows the sensing signals u, v and w generated from the motor 400 in relationship to the binary signals hu, hv and hw generated from the binary circuit 300. The sensing signal hu has a period t1. The number of rotations of the motor 400 is as follows:

$$\text{Rotation No. of Motor} = \frac{60 \ [\text{sec}]}{m \times t1} \quad (1)$$

where m is the number of the binary signals hu generated when the motor 400 rotates once. The binary signal hv is generated a prescribed time after the binary signal hu has been generated. The interval between the rising edge of the binary signal hu and the rising edge of the binary signal hv is a phase difference t2 between the binary signals hu and hv. When expressing the period t1 as 360°, the phase difference t2 is 120° during the forward rotation of the motor 400 and 240° during the backward rotation of the motor 400. That is, the phase difference t2 can be expressed as:

$$\text{Phase Difference } t2 \text{ during Forward Rotation of Motor} = \frac{t1}{3} \quad (2)$$

$$\text{Phase Difference } t2 \text{ during Backward Rotation of Motor} = \frac{(2 \times t1)}{3} \quad (3)$$

Referring once again to FIG. 3, the rotational direction sensor 302 checks whether the motor 400 rotates forwardly or backwardly by analyzing the phase difference t2, which varies according to the forward or backward rotation of the motor 400. In other words, the rotational direction sensor 302 counts the interval between the rising edge of the binary signal hu and the rising edge of the binary signal hv. If the counted value corresponds to the phase difference t2 experienced during the forward rotation of the motor 400 (in this example 120°), the rotational direction sensor 302 generates a forward rotation sensing signal. If the counted value corresponds to the phase difference t2 experienced during the backward rotation of the motor 400 (in this example 240°), the rotational direction sensor 302 generates a backward rotation sensing signal. The rotational direction sensor 302, in turn, supplies the forward or backward rotation sensing signal to the system controller 408. Therefore, the system controller can determine the rotational state of the motor 400.

The binary signal hu is supplied to the rotational state sensor 304 which counts the period t1 of the binary signal hu and determines the rotational state of the motor 400. Basically, the system controller supplies to the rotational state sensor 304 a number N of rotations corresponding to a forward acceleration limit speed, a number M of rotations corresponding to a backward acceleration speed limit, a number R of rotations corresponding to normal driving, a number A of rotations corresponding to an error limit, and a number E of rotations of an explosive state. The rotational state sensor 304 compares the period t1, as counted by a stable clock of crystal series with those numbers. If the counted period value is less than the number N, the rotational state sensor 304 generates a forward acceleration signal; if the counted period value is greater than the number M, the rotational state sensor 304 generates a backward acceleration signal; if the counted value is between R+a and R−a, the rotational state sensor 304 generates a normal driving signal; and if the counted value is greater than the number E, the rotational state sensor 304 generates an explosive signal. The forward and backward rotation sensing signals, the forward and backward acceleration signals, the normal driving signal and the explosive signal are all supplied to the motor control signal generator 404 (see FIG. 8).

Figure 5:
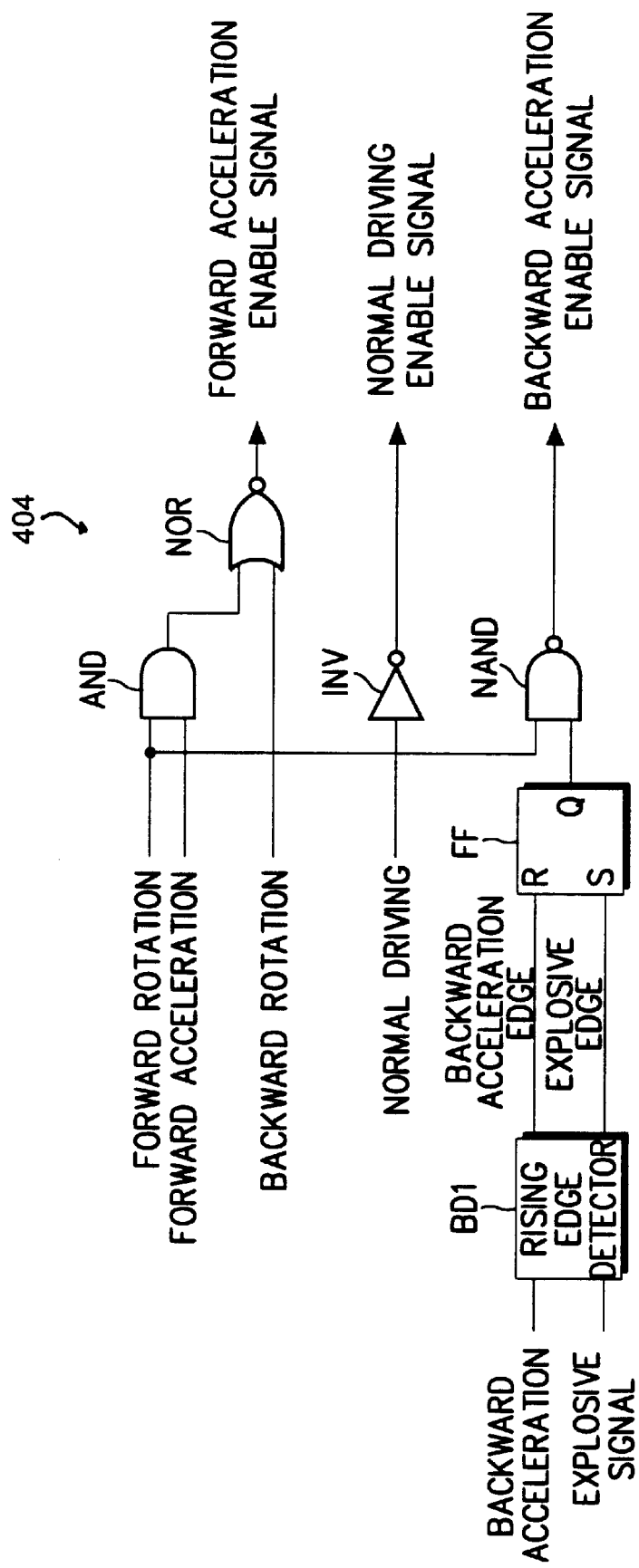
FIG. 5 is a block diagram of a motor control signal generator according to the preferred embodiment of the present invention.

FIG. 5 is a block diagram of the motor control signal generator 404. The forward rotation sensing signal and the forward acceleration signal, from the motor rotation state detector 402 are supplied to an AND gate. The output of the AND gate and the backward rotation signal are supplied to a NOR gate. The NOR gate outputs a forward acceleration enable signal to the motor acceleration controller 406 (FIG. 8). The forward acceleration enable signal is generated when the forward rotation sensing signal and the forward acceleration signal are simultaneously generated or when the backward rotation sensing signal is generated.

The normal driving signal is passed through an inverter INV producing a normal driving enable signal. The normal driving enable signal is generated when the normal driving signal is generated.

The backward acceleration signal and the explosive signal are supplied to a rising edge detector BD1. The rising edge detector BD1 detects the rising edges of the backward acceleration and explosive signals and generates a backward acceleration edge signal and an explosive edge signal. The backward acceleration edge signal is supplied to a reset terminal of a flip-flop FF, while the explosive edge signal is supplied to a set terminal the flip-flop FF. The flip-flop FF is reset by the backward acceleration edge signal and set by the explosive edge signal. The output of the flip-flop FF is supplied to a NAND gate. The NAND gate receives the output of the flip-flop FF and the forward rotation sensing signal to output a backward acceleration enable signal. The backward acceleration enable signal is generated until the backward acceleration signal is generated since the explosive signal is generated while the forward rotation sensing signal is generated. The forward and backward acceleration enable signals and the normal driving enable signal are supplied to the motor rotation controller 406 (FIG. 8).

Figure 6:
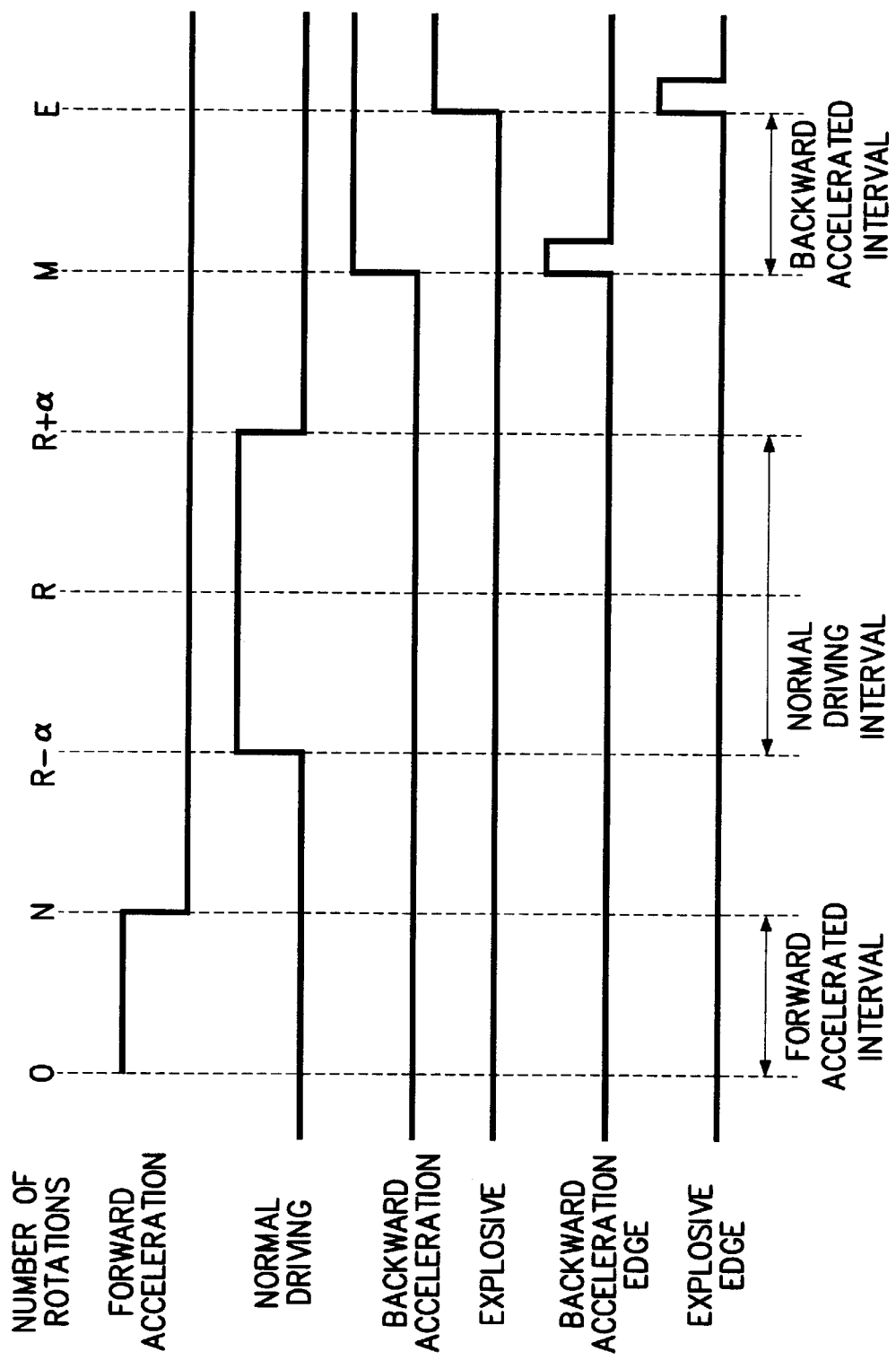
FIG. 6 is a diagram of waveforms showing how a motor rotation control state varies with the number of rotations of a motor.
Figure 7:
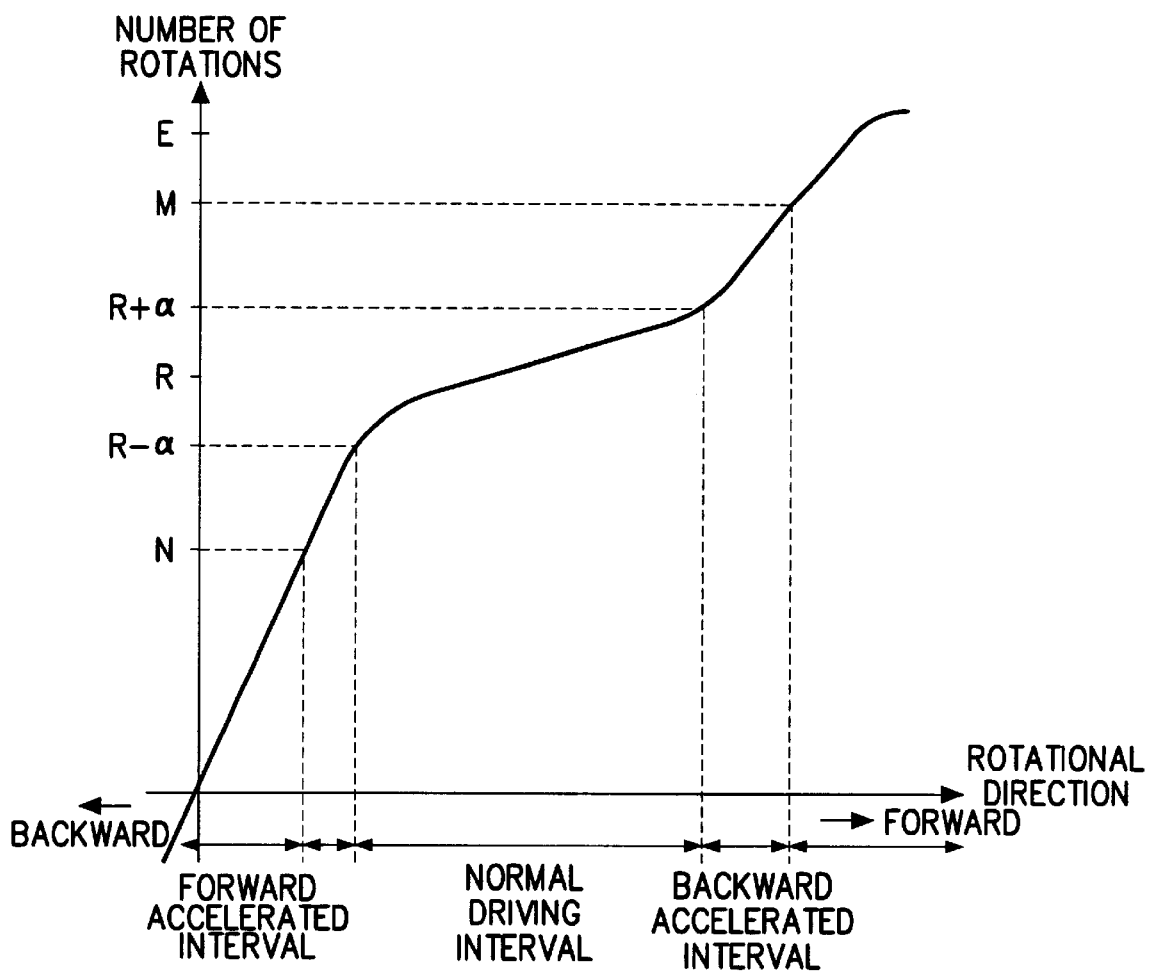
FIG. 7 is a diagram showing the relationship between the number of rotations of a motor and the rotational direction thereof.

FIG. 6 is a diagram of waveforms showing how the motor rotation control state varies with the number of rotations of the motor. FIG. 7 is a diagram showing the relationship between the number of rotations of a motor and the rotational direction thereof. During operation, a forward acceleration command is issued by the system controller causing the motor 400 to be forwardly accelerated until the number of rotations of the motor 400 is greater than the number N corresponding to a forward acceleration speed. If the number of rotations of the motor 400 is greater than the number N, the forward acceleration is ended. Thereafter, the motor 400 is influenced by inertia and enters a normal driving interval ranging between R+a and R−a. During this period the motor 400 is said to be normally driven. If the number of rotations of the motor 400 reaches the number E of rotations corresponding to the explosive state, the motor control signal generator 404 generates the backward acceleration enable signal to accelerate the motor 400 backwardly. Once the number of rotations becomes less than the number M of rotations corresponding to the backward acceleration limit speed, the backward acceleration is ended. Therefore, the motor 400 is influenced by inertia and enters the normal driving interval ranging between R+a and R−a.

As may be appreciated from the aforementioned description, the rotation of the motor is controlled without the constant intervention of the system controller. Therefore, the load of the system controller is reduced. Moreover, the system controller can determine the rotational direction of the motor at any time, and thus can cope with the backward rotation of the motor liable to occur during focus drop.

While the invention has been shown and described with reference to a certain preferred embodiment thereof, it will be understood by those skilled in the art that various changes in form and details may be made therein without departing from the spirit and scope of the invention as defined by the appended claims.

What is claimed:

1. A motor rotation control device that controls a motor in an optical disk player, comprising:

a motor rotational direction sensor that receives a plurality of rotation signals regarding rotation of the motor and determines the rotational direction of the motor by detecting a phase difference between at least two of the rotation signals, said motor rotational direction sensor generating a forward rotation signal during the forward rotation of said motor and a backward rotation signal during the backward rotation of said motor;

a motor rotational state sensor that receives one of the rotational signals and counts the period of the received rotational signal, said motor rotational state sensor outputting a normal driving signal, if the counted period is within a normal driving interval, a forward driving signal if the counted period is within a forward accelerated interval, a backward driving signal if the counted period is within a backward accelerated interval, or an explosive signal if the counted period is within an explosive interval;

a forward acceleration enable signal generator that generates a forward acceleration enable signal when a forward rotation signal and a forward acceleration signal are simultaneously output or when a backward rotation signal is output; and a normal driving enable signal generator that generates a backward acceleration enable signal when an explosive signal has been outputted while said forward rotation signal is outputted until a backward acceleration signal is output.

2. A motor rotation control device that controls a motor in an optical disk player, comprising:

a motor rotational direction sensor that receives a plurality of rotation signals regarding the rotation of the motor and determines the rotational direction of the motor by detecting a phase difference between at least two of the rotation signals, said motor rotational direction sensor generating a forward rotation signal during the forward rotation of said motor and a backward rotation signal during the backward rotation of said motor;

a motor rotational state sensor that receives one of the rotational signals and counts the period of the received rotational signal, said motor rotational state sensor outputting a normal driving signal, if the counted period is within a normal driving interval, a forward driving signal if the counted period is within a forward accelerated interval, a backward driving signal if the counted period is within a backward accelerated interval, or an explosive signal if the counted period is within an explosive interval;

a first gate ANDing the forward rotation signal and the forward acceleration signal;

a second gate NORing an output of the first gate and the backward rotation signal to generate a forward acceleration enable signal;

a third gate inverting the normal driving signal to generate a normal driving enable signal;

a rising edge detector detecting rising edges of the backward acceleration signal and the explosive signal and generating a backward acceleration edge signal and an explosive edge signal;

a flip-flop reset by the backward acceleration edge signal and set by the explosive edge signal;

a fourth gate NANDing an output of said flip-flop and the forward rotation signal to generate a backward acceleration enable signal; and a motor rotation controller forwardly accelerating said motor in response to the forward acceleration enable signal, normally driving said motor in response to the normal driving enable signal, and backwardly accelerating said motor in response to the backward acceleration enable signal.

3. An optical disk player comprising:

a motor that rotates an optical disk, outputs a rotation signal related to a rotation of the said motor, and outputs a U signal, a V signal and a W signal, each signal being related to the rotation of the motor with the U signal being outputted at a different location than the V signal;

a system controller; and a rotation control device comprising:
  a motor rotation state detector that receives the rotation signal, and detects a phase difference between said U signal and said V signal to determine a direction of rotation of said motor and counts the W signal to determine a type of rotation of said motor;
  a motor control signal generator, connected to said motor rotation state detector, that based on the direction and type of rotation of said motor, outputs an enable signal indicating that said motor should be driven forward, backward or normal; and
  a motor rotation controller, connected to said motor control signal generator, that outputs a motor control signal to said motor based on the enable signal;
  wherein said rotation control device receives the rotation signal, senses a direction and period of rotation of said motor, outputs a signal indicative of the direction of the rotation of said motor to said system controller, and controls the rotation of said motor based on the period of rotation of said motor.

4. An optical disk player, according to claim 3, wherein the type of rotation of said motor is classified as one of forward acceleration, backward acceleration, normal and explosive.

5. An optical disk player, according to claim 3, wherein said motor rotation state detector comprises:

a binary circuit that binarizes the U, V and W signals producing respective hu, hv, and hw signals;

a rotational direction sensor that compares phases of the hu and hv signal and outputs a forward rotation signal or a backward rotation signal to said system controller; and a rotational state sensor that counts a period of the hw signal and outputs one of a forward acceleration, backward acceleration, normal driving and an explosive signal based on the period of the hw signal.

6. An optical disk player, according to claim 3, wherein the type of rotation output by said motor rotation state detector is one of forward acceleration, backward acceleration, normal driving and explosive.

7. An optical disk player, according to claim 6, wherein said motor control signal generator outputs a forward enable signal when the forward acceleration signal is simultaneously output with the forward rotation signal.

8. An optical disk player, according to claim 6, wherein said motor control signal generator outputs a forward enable signal during the backward rotation.

9. An optical disk player, according to claim 6, wherein said motor control signal generator outputs a backward enable signal when the type of rotation is explosive until the type of rotation is backward acceleration.

10. An optical disk player, according to claim 9, wherein the backward enable signal is only generated during forward rotation.

11. An optical disk player, according to claim 3, wherein said motor control signal generator generates the enable signal based on a desired constant linear velocity or constant angular velocity.

* * * * *